United States Patent [19]
Arena et al.

[11] Patent Number: 5,635,093
[45] Date of Patent: Jun. 3, 1997

[54] HEATING PLATE FOR HEATING AN OBJECT PLACED ON ITS SURFACE AND CHEMICAL TREATMENT REACTOR EQUIPPED WITH SAID PLATE

[75] Inventors: Chantal Arena, Le Fontanil; Patrice Noel, Sassenage, both of France

[73] Assignee: Commissariat A L'Energie Atomique, Paris Cedex, France

[21] Appl. No.: 597,378

[22] Filed: Feb. 8, 1996

Related U.S. Application Data

[63] Continuation of Ser. No. 211,313, filed as PCT/FR92/00926, Oct. 6, 1992, published as WO93/07550, Apr.15, 1993 abandoned.

[30] Foreign Application Priority Data

Oct. 7, 1991 [FR] France .................... 91 12315

[51] Int. Cl.⁶ .................... H05B 3/68; C23C 16/00
[52] U.S. Cl. .................... 219/466; 118/725
[58] Field of Search .................... 219/464, 465, 219/466, 448, 459, 452; 118/724, 725, 50.1

[56] References Cited

U.S. PATENT DOCUMENTS

| | | | |
|---|---|---|---|
| 3,781,523 | 12/1973 | Borom | 219/464 |
| 4,394,564 | 7/1983 | Dills | 219/449 |
| 4,889,723 | 12/1989 | Pajares | 219/455 |
| 4,940,886 | 7/1990 | Kicherer | 219/457 |
| 5,001,423 | 3/1991 | Abrami | 219/464 |
| 5,059,770 | 10/1991 | Mahawili | 219/464 |
| 5,227,610 | 7/1993 | Schultheis | 219/449 |
| 5,294,778 | 3/1994 | Carman et al. | 219/448 |

*Primary Examiner*—Teresa J. Walberg
*Assistant Examiner*—Sam Paik
*Attorney, Agent, or Firm*—Oblon, Spivak, McClelland, Maier & Neustadt, P.C.

[57] ABSTRACT

A heating floor or plate for heating an object such as a substrate placed on its surface. A plate is provided whose surface temperature can be accurately adjusted so that the heat quantity supplied by two surface zones of the plate can be different even if the zones are small and contiguous. The plate has n zones, each having placed therein an electrically conducting heating element. n+1 sensors are used to measure the temperature of the plate, where n is an integer greater than 1. Data output from the sensors is processed and compared with at least one reference value and the result used to regulate the intensity of the current flowing in the elements based on the comparison.

9 Claims, 2 Drawing Sheets

HEATING PLATE FOR HEATING AN OBJECT PLACED ON ITS SURFACE AND CHEMICAL TREATMENT REACTOR EQUIPPED WITH SAID PLATE

This is a continuation of application Ser. No. 08/211,313 filed on May 27, 1994, now abandoned, which was filed in PCT Application Number PCT/FR92/00926 filed on Oct. 6, 1992, published as WO93/07550, Apr. 15, 1993.

BACKGROUND OF THE INVENTION

1. Field of the Invention

The present invention relates to a heating floor or sole for heating an object, such as a substrate, which is preferably thin and placed on its surface, as well as to a chemical treatment reactor having such a sole.

2. Discussion of the Background

Chemical treatment reactors more particularly make it possible to produce deposits of materials, e.g. by the procedure known as chemical vapour deposition or CVD, on a substrate. Said substrate is generally a silicon wafer used in the manufacture of electronic components. This type of chemical treatment requires the substrate to be heated to between 20° and 1000° C.

Chemical treatment reactors are able to heat the substrate either indirectly by radiation emitted by a light source such as tungsten halogen lamps (cf. in particular the reactor of the Spectrum Company), or directly by contact between said substrate and a heating plate (cf. in particular the reactor of the Varian Company). In the case where the substrate is placed on a heating plate, the temperature distribution at the substrate directly corresponds to the temperature distribution on the plate.

However, in reactors, said substrate is sometimes kept in contact with the plate by a peripheral clamping ring, which exerts a pressure on the periphery of said substrate. As said ring is generally a good heat conductor, locally there is frequently a temperature drop in the substrate.

Moreover, in the prior art plates, the metal bed or base plate thereof only contains a single heating resistor positioned in accordance with a particular spatial distribution, which is adapted to its use. As this heating resistor is traversed by a single current, the only possible temperature variations on the surface of the plate are due to surface distribution differences of the heating resistor in the bed plate. It is therefore difficult for steric dimensional reasons to overheat a precise zone in order to make up for a local temperature drop.

U.S. Pat. No. 3,134,006 discloses a temperature checking system for a heating element having sensors and control loops of the master and slave type. EP-A-165 114 discloses a heat regulating device for a hot runner mould. However, the teachings of these documents are not applicable to a heating plate.

It would therefore be desirable to have a heating plate whose surface temperature can be more accurately adjusted and whereof the heat quantity supplied by the two surface zones of the plate can differ even if said zones are small and contiguous.

SUMMARY OF THE INVENTION

To this end, the invention relates to a heating plate for ensuring the heating of an object placed on its surface, said plate incorporating a bed or base plate made from a material having a good thermal conductivity.

According to the features of the invention, the bed plate comprises n zones, within each of which is placed an electricity conducting element of length $L_n$, traversed by a current of intensity $I_n$ and intended for ensuring the heating of the corresponding bed plate zone, n+1 sensors for measuring the temperature of the surface of the bed plate, said measuring sensors being positioned at the ends of each zone, n being an integer greater than 1, means for the pairwise processing of data supplied by the measuring sensors surrounding the corresponding zone to be heated, means for comparing the value supplied by the processing means with at least one reference value and means for regulating the intensity of the current $I_n$ flowing in each electricity conducting element, said regulating means being dependent on the comparison means. Thus, as a result of the invention, it is possible to subdivide the heating plate surface into several zones to be heated. The number of zones will be determined as a function of the heating accuracy which it is desired to obtain. Two temperature measuring sensors are associated with each zone to be heated. The values measured by these sensors are transmitted to the processing means, which supply a calculated value. The latter is then compared with a reference value corresponding to the desired temperature in said zone. This reference value can be the same or different for all the zones. When said reference value is unique, the temperature profile of the bed plate is flat. However, when the reference values differ, there is a different temperature profile, e.g. a curve rising from the centre of the bed plate. Moreover, even in order to maintain a flat temperature profile, bearing in mind local heat losses, two contiguous zones can receive different heat quantities by means of the conductor elements. Thus, these conductor elements can have a different surface distribution and length $L_n$. As a result of the regulating means, is also possible to differently vary the intensity of the currents $I_n$ flowing through said conductor elements.

Preferably, the bed plate is circular and the different bed plate zones are annular and concentric.

To the extent that the treated objects, such as the substrates are generally circular, because they are usually silicon wafers, the circular shape of the bed plate and the concentric shapes of the heating zones are particularly appropriate for this type of application. However, it is obvious that for objects having different shapes, it would be possible to envisage other shapes of the bed plate or the zones without passing outside the scope of the invention.

Advantageously, the conductor element is positioned within each zone in accordance with a spiral. This particular arrangement is advantageous because, when the conductor element is particularly rigid, there is an avoidance of bent lines, which could lead to the breaking of said element.

Preferably, the temperature measuring sensors respectively incorporate a thermocouple, which is readily commercially available. However, it would also be possible to use other temperature measuring sensors such as e.g. optical pyrometers positioned outside the bed plate.

Advantageously, the data processing means supplied by the two measuring sensors surrounding a zone to be heated make it possible to calculate the mean value of the two temperatures supplied. It would also be possible to envisage performing another calculation on the basis of the two temperatures supplied by the measuring sensors. This calculation is dependent on the desired temperature profile on the bed plate.

Finally, the regulating means incorporate n variable current supply means, each of them being connected to the two ends of one of the electricity conducting elements. These means can be easily produced and are inexpensive. As a function of the variations between the calculated value and the reference value, the regulating means, dependent on the comparison means, react so as to vary the intensity of the current at the terminals of each conductor element.

The invention also relates to a reactor for the chemical treatment of a thin substrate having a heating plate like that described hereinbefore and which is intended to receive on its surface the said substrate.

BRIEF DESCRIPTION OF THE DRAWINGS

The invention is described in greater detail hereinafter relative to a preferred embodiment and with reference to the attached drawings, wherein show.

DESCRIPTION OF THE PREFERRED EMBODIMENT

For great clarity of the description, a substrate will be used as the example of the object placed on the heating floor or plate.

Figure 2:
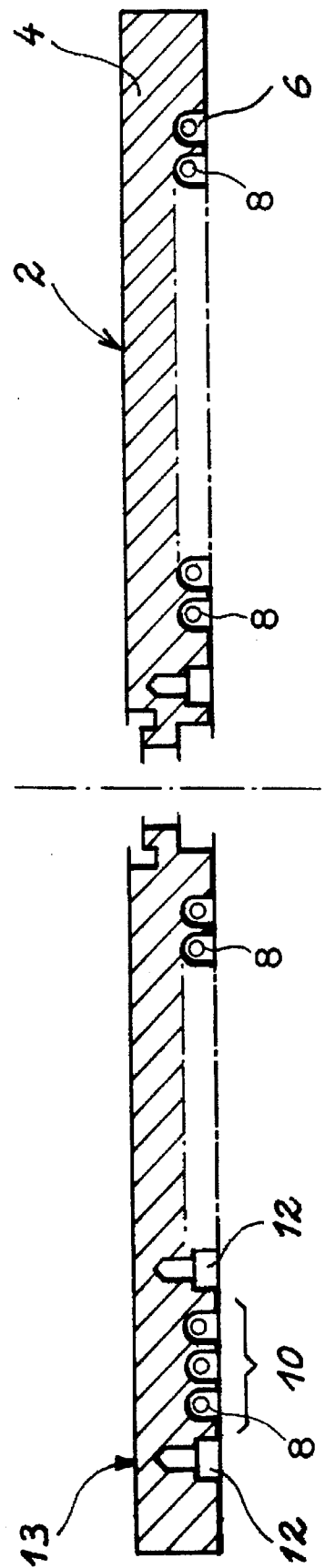
FIG. 2 A sectional view of the heating plate according to the invention.

As illustrated in FIG. 2, the heating plate according to the invention is to be used for heating a not shown substrate placed on its surface 2. The plate comprises a bed or base plate 4 made from a material having a good thermal conductivity. This material must also have a good mechanical behaviour compatible with the temperature of use. For example, it is possible to use certain metals, boron nitride or graphite.

This bed plate 4 is internally provided with a preferably continuous groove 6 having a planar spiral shape and within which are placed and brazed n conductor elements 8, n being an integer greater than 1. These conductor elements 8 are only diagrammatically shown in FIG. 1.

In the preferred embodiment of the invention, the bed plate 4 of the heating plate is circular, because the treated substrate is also circular. Therefore the conductor elements 8 are preferably arranged in spirally wound manner along the groove 6. The n electricity conducting elements 8 in each case have a variable length $L_n$. Each electricity conductor 8 defines at the surface of the bed plate 4 a corresponding zone 10. More specifically, each zone is defined by the dimensions and the winding of a conductor element 8. Consequently, as a function of the length $L_n$ of the conductor element and its surface distribution, the zone 10 will be of varying width. The zones 10 are annular and concentric.

Figure 1:
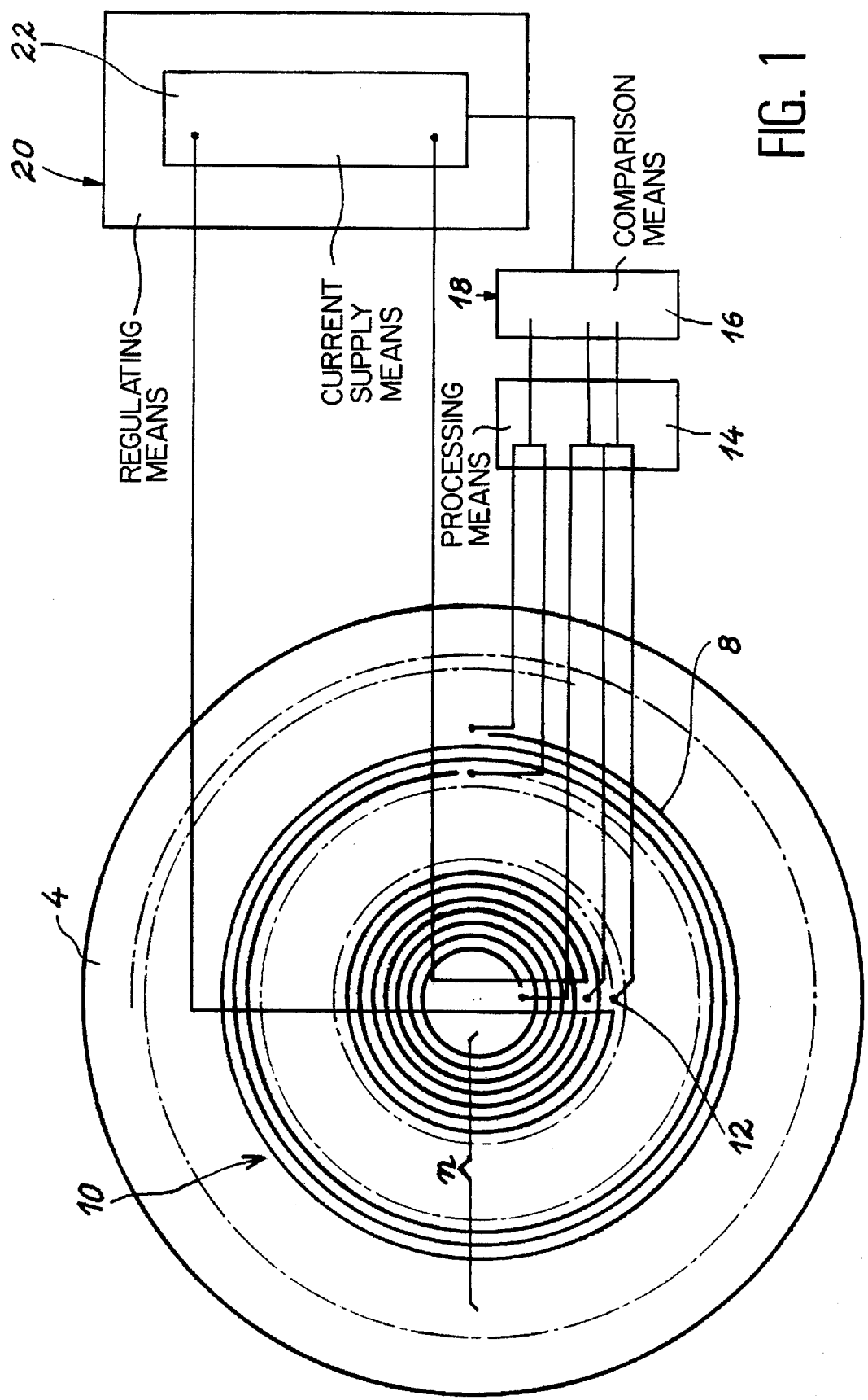
FIG. 1 A diagram of the invention, the plate being shown from above.

The heating plate also has n+1 temperature measuring sensors 12, which are preferably arranged substantially level with the two ends of each electricity conductor element 8. In other words, each measuring sensor 12 is placed between the ends of two adjacent windings of elements 8. These sensors are preferably thermocouples. Consequently and as can be seen in FIG. 1, it is also possible to consider that a thermocouple is positioned on the one hand on the inner, annular rim of a zone 10 and that the following thermocouple is placed on the outer rim of said same zone. These thermocouples are of a conventional nature and will consequently not be described in greater detail. As illustrated in FIG. 2, they make it possible to record the temperature at a point 13 on the surface 2 of the bed plate 4 above said thermocouple 12.

As can be seen in FIG. 1, the heating plate according to the invention incorporates means 14 for processing the data supplied by the measuring sensors 12. These processing means 14 comprise a computer making it possible to pairwise process the data supplied by the two measuring sensors 12 located at the two ends of the same zone 10. The processing means 14 e.g. make it possible to form the mean value of two temperatures recorded on two sides of the zone 10 and deduce therefrom the mean temperature prevailing at the level of the surface of the plate in said zone.

The plate also incorporates comparison means 16 connected to the data processing means 14 and making it possible to compare the value supplied and calculated by the processing means 14 with a reference value 18 corresponding to the treated zone. The comparison means 16 are connected to means for regulating the intensity of the current $I_n$ flowing in each conductor element 8, said means being given the general reference 20. These regulating means 20 comprise n variable current supply means 22, whereof only one is diagrammatically shown in FIG. 1. Each means 22 is connected to the two ends of a conductor element 8.

The present invention makes it possible to produce a plate where the heating temperatures can be adjusted during its manufacture and/or during its operation.

During manufacture, the length $L_n$ of each conductor element 8 can be adjusted so as to have a surface distribution corresponding to the heat quantity which it is wished to obtain in a given zone. The length $L_n$ of each conductor element 8 is also conditioned by the plate dimensions.

During operation, the supply means 22 make it possible to vary the intensities injected into the conductor elements 8, which also has the effect of varying the temperature on the corresponding surface 2 of the bed plate 4.

Finally, the number of each conductor element 8 will be determined as a function of the precision of the temperature profile required on the surface of the bed plate 4.

The plate according to the invention is more particularly intended for use in a chemical treatment reactor, but it could also be used for other purposes where a precise heating of an object is necessary.

We claim:

1. A heating plate for heating an object such as a substrate placed on its surface, said plate comprising:
    a bed plate made from a material having good thermal conductivity, said bed plate having n zones, where n is an integer greater than 1;
    a plurality of electrically conducting elements of length $L_n$, with one of said elements being placed in each zone, each element being traversed by a current of intensity $I_n$ to heat the corresponding zone;
    n+1 sensors, each measuring the temperature of the surface of the bed plate and being positioned at ends of each zone;
    means for processing pairs of data supplied by the measuring sensors at either end of a corresponding zone to be heated;
    means for comparing a value supplied by the means for processing with at least one reference value; and
    means for regulating the intensity of the current flowing in each element, depending on the output of the comparison means, to adjust independently the heat quantity supplied by each zone in order to obtain a chosen temperature profile.

2. A heating plate according to claim 1, wherein the bed plate is circular and the zones are annular and concentric.

3. A heating plate according to claim 1 or 2, wherein each conductor element is positioned within the corresponding zone in the form of a spiral.

4. A heating plate according to claim 3, wherein the bed plate is internally provided with a spiral groove within which is brazed the corresponding element.

5. A heating plate according to claim 1, wherein the sensors are thermocouples.

6. A heating plate according to claim 1, wherein the means for processing receives data from two measuring sensors on opposite ends of a zone to be heated and calculates the mean value thereof.

7. A heating plate according to claim 6, wherein the means for comparing compares the mean value with a reference temperature.

8. A heating plate according to claim 1, wherein the regulating means includes n variable current supply means, with each current supply means being connected to two ends of an element.

9. A reactor for the chemical treatment of a substrate, comprising the heating plate according to one of claims 1, 2, 5, 6, 7 or 8, said plate receiving said substrate on its surface.

* * * * *